US010864945B2

(12) United States Patent
Derissaint et al.

(10) Patent No.: US 10,864,945 B2
(45) Date of Patent: Dec. 15, 2020

(54) KINETIC AUTOMOBILE

(71) Applicants: Roger Derissaint, Capital Heights, MD (US); Audrey Nwaze, Greenbelt, MD (US)

(72) Inventors: Roger Derissaint, Capital Heights, MD (US); Audrey Nwaze, Greenbelt, MD (US)

( * ) Notice: Subject to any disclaimer, the term of this patent is extended or adjusted under 35 U.S.C. 154(b) by 0 days.

(21) Appl. No.: 16/393,541

(22) Filed: Apr. 24, 2019

(65) Prior Publication Data

US 2019/0351948 A1 Nov. 21, 2019

Related U.S. Application Data

(60) Provisional application No. 62/661,915, filed on Apr. 24, 2018.

(51) Int. Cl.
| | |
|---|---|
| *B62D 24/04* | (2006.01) |
| *B60L 53/00* | (2019.01) |
| *B60K 6/10* | (2006.01) |
| *B62D 21/11* | (2006.01) |
| *B62D 37/04* | (2006.01) |

(52) U.S. Cl.
CPC .............. *B62D 24/04* (2013.01); *B60K 6/105* (2013.01); *B60L 53/00* (2019.02); *B62D 21/11* (2013.01); *B62D 37/04* (2013.01)

(58) Field of Classification Search
CPC ......... B60L 53/00; B62D 24/04; B62D 21/11; B62D 37/04; B60K 6/10–105
See application file for complete search history.

(56) References Cited

U.S. PATENT DOCUMENTS

| | | | | |
|---|---|---|---|---|
| 1,965,476 | A * | 7/1934 | Smith | B60P 1/167 298/38 |
| 3,711,157 | A * | 1/1973 | Smock | B60P 1/165 298/8 R |
| 4,813,509 | A * | 3/1989 | Harris | B60K 6/10 180/165 |
| 4,815,730 | A * | 3/1989 | Hoffenberg | A63B 21/015 482/61 |
| 5,381,987 | A * | 1/1995 | Carns | B64F 1/22 123/142.5 R |
| 7,416,378 | B1 * | 8/2008 | Adams | B60P 1/6445 254/93 HP |
| 8,640,800 | B2 * | 2/2014 | Armbruster | B60K 7/0007 180/65.6 |
| 9,120,511 | B1 * | 9/2015 | Beard | B60L 15/20 |

(Continued)

OTHER PUBLICATIONS

International Search Report issued in co-pending International Application No. PCT/US19/29015 dated Aug. 9, 2019.

*Primary Examiner* — Erez Gurari
(74) *Attorney, Agent, or Firm* — Whiteford, Taylor & Preston, LLP; Peter J. Davis

(57) ABSTRACT

The "Kinetic Kar" will have a large high pressure chamber filled with hydraulic fluid pressured up to 20 ton for the initial motion of the car. The pressure harvested by means of pumps, pistons, valves, and electrical gadget will be too high for the high pressure chamber. It is estimated that the car will move from zero to 20 miles in a matter of 2 seconds and run at up to 150 miles per hour for a mile before pressure tank is depleted totally. It will only take 3-4 seconds for pressure reservoir to replenish.

5 Claims, 1 Drawing Sheet

Side Elevation

(56) References Cited

U.S. PATENT DOCUMENTS

| | | | | |
|---|---|---|---|---|
| 2001/0056544 A1* | 12/2001 | Walker | ............... | B60T 7/18 |
| | | | | 726/2 |
| 2004/0124019 A1* | 7/2004 | Harrup | ............. | B60K 7/0007 |
| | | | | 180/65.1 |
| 2011/0232984 A1* | 9/2011 | Wurm | ............. | B60K 7/0007 |
| | | | | 180/69.6 |
| 2012/0313575 A1* | 12/2012 | Stansbury, III | ........ | B60G 13/14 |
| | | | | 320/107 |
| 2018/0209524 A1* | 7/2018 | Dodson | ............. | B61C 9/16 |
| 2020/0119614 A1* | 4/2020 | Gu | ............. | H02K 21/12 |

* cited by examiner

Top Plan

Side Elevation

KINETIC AUTOMOBILE

CROSS REFERENCE TO RELATED APPLICATION

This application is based upon and claims benefit of U.S. Provisional Patent Application Ser. No. 62/661,915 entitled "KINETIC AUTOMOBILE," filed with the United States Patent and Trademark Office on Apr. 24, 2018 by the inventor herein, the entirety of which is incorporated herein by reference.

BACKGROUND OF THE INVENTION

Field of the Invention

The present invention relates to automobiles.

SUMMARY OF THE INVENTION

For a car to move, it requires some kind of energy. The energy that is found in petrol (gasoline) is potential energy. An engine converts that potential energy into kinetic energy that puts the car in motion. Once in motion, the momentum would keep it going forever were it not for friction and air resistance which gradually absorbs the energy. Accordingly, the car will come to a stop if the energy is not continuously replenished.

Petrol is not the only element that stores energy, and also there are various means to convert store energy into motion. From its motion, the car develops various forms of other energies. These independent sources of energy, if tapped efficiently, can be more than enough to compensate for energy lost due to friction an air resistance. According to the present invention, enough energy generated from the motion and various related forces can be tapped and saved in order to be used later to put the car back in motion after a stop.

Figure 1:
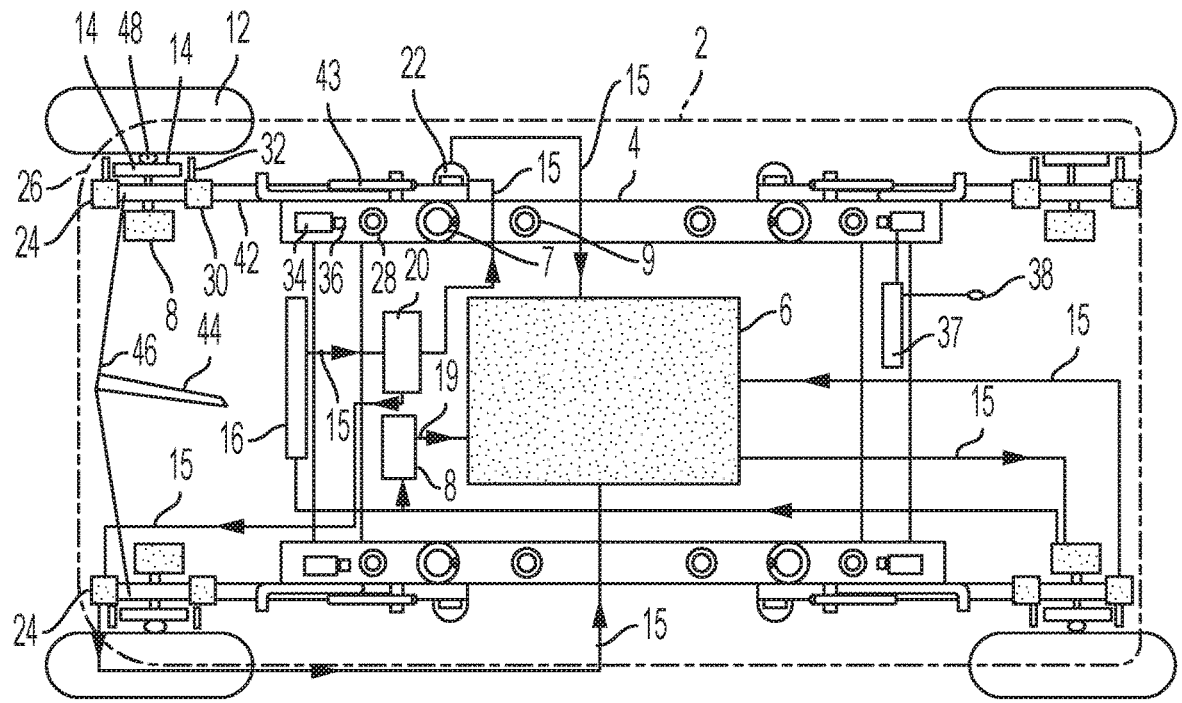
FIG. 1 is a top plan representation of a Kinetic automobile according to an embodiment of the present invention.
Figure 2:
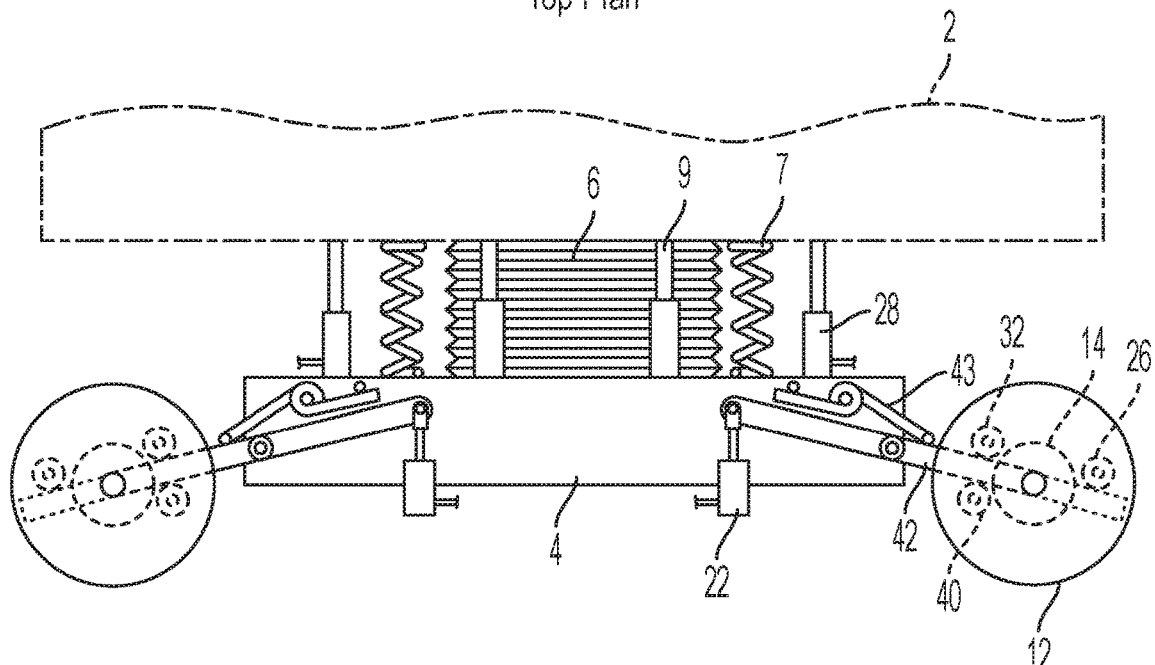
FIG. 2 is a side elevational representation of a Kinetic automobile according to an embodiment of the invention shown in FIG. 1.

Features in the attached drawings are numbered with the following reference numerals 2 Chassis
4 Frame
6 Kinetic box
7 Tension Springs
8 Hydraulic drive motor
9 Guide posts
10 Drive shaft
12 Wheel
14 Flywheel
15 Hydraulic line
16 Radiator
18 Overfill reservoir
19 Return line
20 Primary reservoir
22 Shock pumps
24 Braking hydraulic pump
26 Braking hydraulic pump gear
28 Jacks
30 Alternators
32 Alternator gears
34 Batteries -continued 36 Capacitors
37 Charging system
38 Charging system port
40 Stationary parking gears
42 Wheel arm
43 Wheel support spring
44 Slip-joint steering column
46 Steering Assembly
48 Wheel knuckle

DETAILED DESCRIPTION

The 'kinetic kar' will have a large chamber or "kinetic box" filled with hydraulic fluid pressurized up to 20 ton for the initial motion of the car.

The Kinetic box 6 is a specially built collapsible bellow that is no less than 3 ft in length and when fully in the vertical direction will reach a height of approximately 1 ft. The Kinetic box will be bolted to the chassis 4, in the space between the car frame 4 and the chassis 2, with the box 6 preferably supporting the entire or nearly the entire weight of the chassis 2. The weight of the chassis 2 on the box 6 creates hydraulic pressure. To create even more pressure in the kinetic box 6, rubber bands or heavy steel springs 7 will pull the chassis down to the frame 4. See page picture page 1. Together, the weight of the chassis 2 and the tension of the bands/springs 7 can generate greater than 20 tons of pressure. Guide posts 9 allow the chassis 2 to move vertically only, and not laterally.

Power and Motion

The kinetic box 6 is connected to 4 hydraulic drive motors 8, one at each wheel 12, via hydraulic lines 15. When the accelerator pedal is depressed, a continuously adjustable relay valve responsive to the accelerator pedal will cause hydraulic fluid under pressure to flow from the kinetic box 6 to the hydraulic motors 8 to turn the wheels 12 at 7,000 to 14,000 rpm. The more the accelerator is depressed, the further the relay valve opens allowing more hydraulic fluid to flow to the hydraulic motors 8 causing them to turn faster.

The hydraulic motors 8 will preferably have large and heavy flywheels 14 to create momentum. Once the desired is reached, the driver will preferably release pressure from the accelerator, and the car will coast until additional speed is desired. The effect will be like propulsion in space: accelerate and coast.

From the hydraulic motors 8, the hydraulic fluid will flow to a radiator 16, where it will cool and lose pressure. Fluid may also flow to an overfill reservoir 18. See picture page 8. The fluid in the overfill reservoir 18 will return to the kinetic tank 6 via return line 19 when suction occurs in the kinetic tank.

Hydraulic fluid in the radiator 16 will flow to the primary reservoir 20. Additional hydraulic fluid lines 15 will run from the reservoirs 18, 20 to shock absorbing pumps (Shock-pump) 22 and braking hydraulic pumps 24. The shock absorbing pumps 22, as many as four (4) per wheel, play the role of shock absorbers and pumps and are specially designed to withstand large shocks and to deliver high pressure fluid when meeting with shocks. Hydraulic lines connect the pumps 22 to the kinetic box 6.

Braking hydraulic pumps 24 are provided, one for each wheel. These hydraulic pumps 24 will be equipped with gears 26. The gears 26 of the braking pumps 24 will be at close clearance to the teeth of the flywheel 14 which drive the wheel when the accelerator is depressed, and which spin with the wheel when the car is coasting. When the brake pedal is strongly depressed, it will cause the gears 26 of the braking hydraulic pumps 24 to engage the teeth of the spinning flywheel 14. The flywheels 14 will then forcefully drive the gears 26 of the hydraulic pumps 24, generating tremendous amount of fluid pressure which will drive high pressure hydraulic fluid back to the kinetic box 6 via hydraulic lines 15.

The fluid pressure harvested from the shock-pumps 22 and the braking hydraulic pumps 24 and provided to the kinetic box 6 is used to continue the drive cycle. To keep the kinetic box 6 from becoming fully depleted, there may be provided two to four 12 volt jacks 28 on each side of the kinetic box 6 positioned to lift up the chassis 2 from the frame 4. This action will expand the kinetic box 6, creating suction, drawing hydraulic fluid from the reservoirs 18, 20. Indeed, it is by means of this suction that the hydraulic fluid finds its way to the kinetic box 6 in the first place for the initial motion, and the weight of the chassis 2 provides the pressure. When the accelerator pedal is depressed, the jacks 28 are released; when the accelerator pedal is released, the jacks 28 engage the chassis 2 and they lock, preventing unnecessary loss of pressure from the dropping of the chassis 2 when acceleration is not required.

Electrical and Charging Systems

Four alternators 30 and four dedicated batteries 34 are preferably provided to provide electricity for the car. The alternators 30 are preferably arranged similar to the braking hydraulic pumps, one for each wheel, with alternator gears 32 close to and engage-able with the flywheels 14. If the alternators 30 are turning constantly, the charging load should be applied only when needed. The first battery may be preferably dedicated for lighting and is preferably connected to one of the back wheel alternators. The second battery may be preferably dedicated for HVAC and may be connected to the other back wheel alternator. The third battery may be dedicated to horn radio wipers locks windows and may be connected to one of the front wheel alternators. The fourth battery may be preferably dedicated for jacks, brakes, and control valves and will be connected to the other front wheel alternator. A super capacitor pack 36 is preferably dedicated to each battery for charging it. A charging port 38 is preferably provided for connecting the batteries to an electrical charging system 37.

Braking Systems

When the brake pedal is depressed, the alternator's gears 32 will engage the flywheel 14 first. The charging load will have the effect of slowing the car down. When the brake pedal is released, the alternator gears 32 will disengage from the flywheel 14. The brake pedal will return to his original position.

After the alternators are engaged with the flywheel upon initial depression of the brake pedal, if the brake pedal is depressed further then gears 26 of the braking hydraulic pumps 24 will engage the flywheel 14. The charging load from the alternators 30 combined with the high pressure built up by the hydraulic pumps 24 in the kinetic tank 6 creates a resistance strong enough to stop the wheels instantly without locking them. If the brake pedal is depressed even further, a set of stationary parking gears 40 will engage the flywheels 14 and lock the wheels, thereby preventing the car from rolling after a stop. The stationary gears 40 can stop the car by locking all wheels. When the parking gears 40 are engaged, the brake pedal will not return to its original position (acting as a parking brake), until the brake pedal is depressed to the floor.

Suspension

The car preferably features a four (4) wheels independent suspension. Each wheel may be supported by a spring loaded wheel support or "wheel arm" 42 attached to the frame. A spring 43 forces the wheel toward the ground. According to a preferred embodiment, the wheel support 42 will support the wheel 12, the flywheel, the hydraulic drive motor 8, the alternator gears 32, the braking hydraulic pump gears 26 and the shock pumps 22. The front arms 42 will also give support to the steering assembly.

Steering

Steering will operate the same as a conventional automobile except that a slip-joint steering column 44 is connected to the steering assembly 46 to accommodate the vertical movement of the chassis. Conventional wheel knuckle 48 preferably provided on the wheel side of the flywheel to permit turning under control of the steering assembly.

Other Features

Each wheel is a unit in itself "a power plant." A power plant has its own separate drive train—suspension—brake and charging systems. According to alternative embodiments, a single piece of equipment will serve as motor, pump and generator combined.

According to alternative embodiments, air or water can be substituted for hydraulic fluid.

According to further alternative embodiments, two different drive systems can be used to run the car, for example the front wheels may be powered by electric drive motors while the rear wheels are powered by hydraulic systems described herein or vice and versa.

The invention claimed is:
1. An automobile comprising:
   a frame;
   a chassis;
   a plurality of spring-biased wheel supports connected to the frame;
   a wheel attached to each wheel support by a drive shaft;
   a flywheel fixed to the drive shaft or to the wheel so that it does not rotate relative to the wheel;
   a collapsible bellow located between the frame and the chassis and configured to receive the weight of the chassis to build pressure within the collapsible bellow;
   a plurality of tension elements connected at one end to the frame and at a second end to the chassis to pull the chassis toward the frame to build additional pressure within the collapsible bellow;
   a plurality of guide posts situated between the frame and the chassis to prevent lateral movement of the chassis relative to the frame;
   a plurality of electrically powered jacks situated between said frame and to said chassis to lift the chassis away from the frame to create suction within the collapsible bellow;
   a hydraulic drive motor situated adjacent at least one wheel and connected to said drive shaft; said hydraulic drive motor also attached to said collapsible bellow via hydraulic lines for providing hydraulic power to said hydraulic drive motor;
   an alternator having an alternator gear reversibly engage-able with said flywheel for providing kinetic power to said alternator; said alternator electrically connected to a battery for charging said battery;
   a braking hydraulic pump having a gear reversibly engage-able with said flywheel and connected to collapsible bellow for providing pressurized fluid to said collapsible bellow when said hydraulic pump gear is engaged with said flywheel during motion of said automobile;

a stationary braking/parking gear reversibly engage-able with said flywheel to stop said flywheel from rotating and to keep said car in a motionless state;

a shock-pump attached at one end to said frame and at a second end to said wheel support and connected to said collapsible bellow via hydraulic lines for providing pressurized fluid to said collapsible bellow upon compression of said shock pump during motion of said automobile;

wherein pressure developed in said collapsible below from the weight of said chassis, the tension of said tension elements, and pressurized fluid received from said braking hydraulic pump and said shock pump is used to force said pressurized fluid to said hydraulic drive motor to cause said drive shaft, flywheel and wheel to accelerate;

and wherein each said wheel support is independently supported by and connected to said frame.

2. An automobile according to claim 1, further comprising an electrical charging system and electrical charging port for charging said battery.

3. An automobile according to claim 1, further comprising a gasoline powered engine.

4. An automobile according to claim 1, having no gasoline powered engine.

5. An automobile according to claim 1, further comprising a battery powered drive system.

* * * * *